United States Patent Office 3,061,622
Patented Oct. 30, 1962

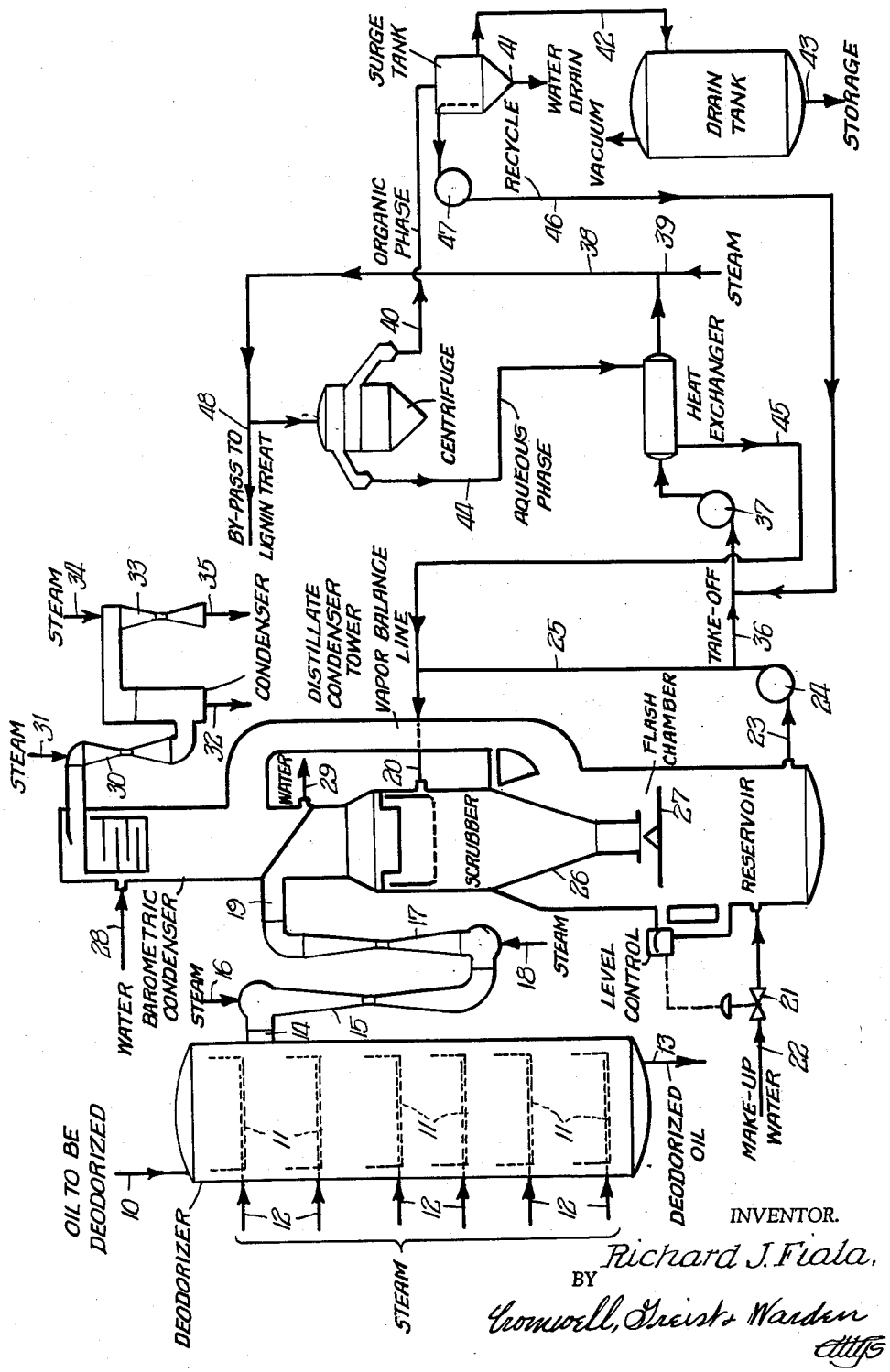

3,061,622
METHOD FOR RECOVERING VEGETABLE OIL DISTILLATES
Richard J. Fiala, Decatur, Ill., assignor to A. E. Staley Manufacturing Company, Decatur, Ill., a corporation of Delaware
Filed Mar. 30, 1959, Ser. No. 802,694
7 Claims. (Cl. 260—428)

The invention relates to the efficient and economical recovery of vegetable oil distillates and is specifically directed to a method and apparatus for use in carrying out the recovery in connection with organic distillates obtained from a vegetable oil deodorization process under vacuum.

A basic problem facing the vegetable fats and oils industry is the recovery of the organic distillates from the deodorization process. This problem is two-fold since the organic distillates represent commercially valuable material and, where disposed of without recovery, constitute contaminants which complicate waste disposal techniques. Efforts have been made to recover the organic distillates from the effluent vapors of a deodorizer and the current procedure includes the drawing of the distillates from the deodorizer into a vacuum system wherein they are condensed in water.

A known type of vapor scrubbing operation includes the use of apparatus identified by the trade name "Convactor," manufactured by Croll-Reynolds Co., Inc. of New York, N.Y. This equipment includes a scrubber wherein effluent deodorizer vapors are mixed with cool scrubber water with complete condensing occurring followed by flashing of water equivalent to the steam content of the deodorizer vapors and subsequent delivery of the steam into a barometric condenser. The scrubber water has condensed therein organic materials including sterols, free fatty acids and neutral oils which with recovery constitute a salable by-product of the deodorization process in the form of soap-stocks. At the present time, such recovered distillates have a commercial value of about 5 cents to 10 cents per pound and the removal of these materials from the condensing water eliminates a rather severe waste disposal problem. Waste disposal can be a serious problem in many localities as waste water carrying the diluted distillates exhibits relatively high BOD requirements.

While the distillate condensing equipment described provides for organic distillate recovery, the organic material is available only at very high dilutions to an extent where known recovery operations are not considered particularly economical. In attempting to economize on distillate recovery, it has been found that increasing the organic concentration therein creates still another problem which has not been overcome. The vegetable oil distillates accumulated in the scrubber condensing water must be maintained at a low concentration by continuously removing a portion of the condensing water emulsion formed and by replacing this portion with fresh water or processed water to maintain the scrubber system in equilibrium. Since the organic vegetable oil distillates consist primarily of free fatty acids (55% to 65%) and triglycerides (25% to 35%), the distillates are relatively immiscible with the condensing water and the accumulated organic material takes the form of an oil-in-water emulsion. At concentrations of less than 1%, the distillate condensing water emulsion is a highly fluid pumpable liquid resembling milk but containing a small amount of curd-like flocs of organic material. As the concentration of the organic material increases toward 2%, the curd-like flocs become thicker and the emulsion becomes less fluid and increasingly less pumpable. When the concentration of organic material rises above 2% the floc becomes so thick that the emulsion loses any resemblance to a Newtonian fluid. At this point it resembles mayonnaise and does not exhibit fluidity or pumpability. Naturally, if the organics are not removed from the condenser equipment and fresh water not substituted, the scrubbing operation will eventually cease.

The foregoing characteristics of the scrubbing operation described limit the operating range of the scrubber and make it imperative that the condensing water be maintained in the scrubber at a low concentration of organic material. It has been found that periodic or batch treatment of the scrubber water is impractical primarily because of the total quantity used in connection with a single deodorizer. By way of example, the weight of condensing water circulated in the scrubber may be about 15,400 lbs. and roughly 51 lbs. of organic material are recovered in the water each hour. On the basis of these figures, a batchwise operation would require the treatment of at least one 15,400 lb. batch every three hours, this calculation being based on 1% organic material concentration in the water. In attempting to process the condensing water containing the organic materials, an average of 23,200 gal. of condensing water must be drained from the condenser system and processed each day resulting in the daily recovery of 1225 lbs. of organic material. This example of daily deodorizer operation is based on an organic material concentration in the condensing water of 0.75% maximum and 0.115% retention in the recycled condensing water following processing thereof.

From the foregoing it will be appreciated that the problem of scrubber condensing water treatment is a substantial one not only from the standpoint of economics but also with respect to the quantity of material which must be handled daily. There are no known efficient and economical distillate recovery systems capable of meeting the daily requirements specified above.

In accordance with the present invention, it was unexpectedly discovered that the concentration of condensables in the condensing water can be effectively and economically maintained at a satisfactory level and prevented from building up excessively to an extent resulting either in eventual inoperativeness of the scrubber or excessive condensing water and distillate waste. This invention makes possible the recovery of the distillates and continuous reuse of the condensing water.

It is an object of the present invention to provide a new and improved method of organic distillate recovery which is particularly adapted for use in conjunction with the deodorization of vegetable fats and oils.

Another object is to provide a vegetable oil distillate condensing and recovery procedure of a continuous nature which provides for the economical recovery of commercially valuable materials while materially reducing the waste disposal problem accompanying the deodorization treatment.

A further object is to provide a vegetable oil distillate condensing and recovery procedure wherein distillate condensing water is heated to break the distillate-water emulsion formed therein and the distillate phase is separated from the recycling water by centrifugation.

Still a further object is to provide an improved closed system for use in recovering organic distillates produced as a result of deodorization of vegetable fats and oils.

Other objects not specifically set forth will become apparent from the following detailed description of the invention made in conjunction with the accompanying drawing which illustrates the method and apparatus of the invention in diagrammatic, flow sheet form.

Referring to the flow diagram, the left-hand portion thereof illustrates a known type of deodorizer which operates continuously under a high vacuum, such as a Girdler deodorizer. Oil to be deodorized is delivered into the top portion of the deodorizer through a line 10 and is subjected to steam treatment under varying temperature conditions as it flows into and through a series of troughs 11 into each of which live steam is delivered through a series of pipes 12. The deodorized oil is taken off at the bottom of the deodorizer through a line 13.

The distillates and steam mixture constituting the effluent from the deodorizer is discharged therefrom through a connection 14 and moves through a first stage booster jet 15 in the form of a venturi operated by steam injected through the line 16. The vapors then move through a second stage booster jet 17 which is operated by steam injected thereinto through a line 18. The steam injected into the booster jets 15 and 17 aid in maintaining the high vacuum under which the deodorizer is operated and in this manner the effluent vapors of the deodorizer including incondensables, organic condensables and steam are delivered into the distillate condenser through an inlet 19.

The distillate condenser illustrated is of the "Convactor" type described above and, by way of example, consists of a 33 foot black iron tower which is designed for a dual purpose. The first purpose of the tower is to remove the non-volatile organic material from the deodorizer effluent vapors and the second purpose is to condense and discharge the jet exhaust steam and deodorizer blowing steam. The tower is divided into two specific sections, an upper barometric condenser section and a lower vapor scrubber section. These two sections are joined by a vapor balance line which allows steam and high volatile organic compounds in the scrubber section to "flash" to the barometric condenser.

The deodorizer effluent vapors enter the upper portion of the scrubber condenser section and are deflected downwardly through a curtain of relatively cool scrubber condensing water delivered into the scrubber section through a line 20. The condensing water is maintained in a closed-circuit system to provide for continuous recirculation thereof through the scrubber section of the tower. This section at the bottom thereof includes a reservoir containing a supply of condensing water the level of which is maintained by a level control operating a valve 21 forming a part of a make-up water supply line 22 which feeds fresh water into the reservoir for level maintenance purposes. In recycling, the condensing water is taken out from the bottom of the reservoir through a line 23 by a pump 24 placed therein and delivered through a line 25 connected with the line 20 in communication with the upper portion of the scrubber section.

Upon contact of the deodorizer effluent vapors with the relatively cool condensing water, the organic material and steam is condensed resulting in a raising of the temperature of the condensing water by the transfer of latent heat. The heated condensing water then falls through a water collecting cone 26 constituting the bottom portion of the upper section of the scrubber and in communication at the base thereof with a flash chamber. A flash plate 27 is located at the base of the cone 26 in the flash chamber to provide for efficient flashing of the more volatile materials from the condensing water. The flash chamber is in communication with the upper barometric condenser section through the vapor balance line and is thus at a slightly reduced pressure as the barometric condenser operates at a slightly reduced pressure relative to the scrubber section. The more volatile materials including the incondensables will flash from the condensing water until thermodynamic equilibrium has once more been attained. This procedure, therefore, leaves only the non-volatile organics in the once again cool condensing water with this water falling into the reservoir for recirculation through the tower. The heat picked up by the condensing water is immediately dissipated by rapid evaporation or flashing of the volatiles therefrom, this evaporation process being facilitated by a rather substantial surface area of condensing water which is exposed by flashing on the cone-shaped baffle or plate 27 as the condensing water falls into the flash chamber. Since a fairly high degree of superheat is present in the vapors entering the tower, the total weight of saturated steam flashed from the warm condensing water is greater than the weight of the incoming vapors. This excess flash is continuously made up by adding water to the tower through the line 22.

The flashed vapors are relatively free of organic contaminants and rise through the vapor balance line to be condensed in the barometric condenser. The flashed material is approximately equal to the sum of the deodorizer blowing steam plus the jet exhaust steam delivered through the lines 16 and 18. Condensing water is supplied through line 28 to the barometric condenser section and is removed through line 29 as waste or for any suitable treatment. The vacuum in the barometric condenser section is drawn by the utilization of a booster jet 30 operated by steam delivered through a line 31 and any effluent vapors taken from the barometric condenser section of the tower are delivered into a smaller condenser connected to the discharge end of the jet 30 from which liquid discharge to a drain is handled through a line 32. Vacuum is maintained on the smaller discharge condenser by a booster jet 33 operated by steam delivered thereinto through a line 34 with the subsequent steam and vapors being discharged in any suitable manner through a line 35, normally to the atmosphere.

The net result of the foregoing operation is the removal of the organic distillates from the deodorizer vapors and concentration of these distillates in the condensing water in the scrubber section of the tower. These distillates, including the physically entrained solids, consist of varying amounts of fatty acids, glycerides, sterols, and tocopherols. As these materials are relatively immiscible with the water in which they are condensed, the accumulation in the condensing water takes the form of an oil-in-water emulsion. Several distinct phases occur in the condensing water as the concentration of organic distillates increases from zero through 1.5%. The following description of these phases is representative of distillates recovered from the deodorization of an acetic anhydride degummed soybean oil which is break-free but contains about 0.2% to 0.3% free fatty acids, such as produced according to the method disclosed in Patent No. 2,782,216.

With the type of oil described, this being generally representative of various types of fatty oils, the condensing water becomes a turbid white, resembling milk, with between 0% and 0.15% organic distillates condensed therein. The fluidity characteristics, as measured by viscosity, are not greatly different from pure water during this phase. Between 0.15% and 1.0% concentration, the organic materials begin to associate, forming solid aggregates or flocs which float on the condensing water. This phase is characterized by a gradually increasing viscosity although the thickening does not materially affect the flow properties of the water. Within the concentration range of about 1.0% to 1.5%, the flocculent organic solids become dense causing the water viscosity to increase more than a 100%. In this phase the fluidity characteristics of the water are greatly reduced. With concentration exceeding 1.5% a gelling action occurs and the water cannot be pumped with the result that the tower becomes inoperative.

It has been found that the concentration of organic distillates in the condensing water can be controlled to provide for continuous operation of the tower by continuously recovering the organic materials from the condensing water in the manner illustrated in the flow diagram. A portion of the condensing water recirculated in the scrubber section is removed for processing through a take-off line 36 connected to the line 25. This portion is moved by a pump 37 through a heat exchanger, the function of which will be subsequently described. From the heat exchanger the condensing water portion is moved through a line 38 into a centrifuge. During the delivery of the condensing water portion into the centrifuge, steam is introduced thereinto through a steam supply line 39 to heat the condensing water to an extent to break the oil-in-water emulsion thereof and separate the same into an organic phase and aqueous phase. In this condition the condensing water portion is introduced into the centrifuge.

The centrifuge may be of any suitable type, such as a DeLaval centrifuge, capable of separating the organic phase from the liquid phase. The organic phase is delivered from the centrifuge through a line 40 into a surge tank wherein entrained water is drained therefrom and discharged through a drain 41. The organic phase collected in the surge tank is then delivered through a line 42 into a vacuum drain tank and from there it is discharged through a line 43 for processing or storage. In this respect, the organic material may be suitably dried to form soapstock of commercial value.

The aqueous phase separated from the organic phase in the centrifuge is recycled to the distillate condenser tower and into the scrubber section for reuse as condensing water therein. This recycling may be accomplished in any desired manner but, as illustrated, it is preferred that the aqueous phase be delivered through a line 44 into the heat exchanger for indirect heat exchange with the condensing water portion being freshly removed from the tower recirculating system through the take-off line 36. By this arrangement the latent heat of the aqueous phase may be efficiently utilized in preheating the condensing water portion being removed from the tower for organic material recovery therefrom. From the heat exchanger the aqueous phase is delivered through line 45 back into the scrubber section or to any other portion of the tower as desired. In a given system it may be desirable to recycle the aqueous phase directly into the reservoir of the tower in the event that the temperature of the same has not been lowered sufficiently for efficient condensing functioning in the scrubber portion.

As will be more fully described, in addition to recycling the aqueous phase, it has been found desirable to recycle a portion of the organic phase from the surge tank through a recycle line 46 including therein a suitable pump 47. This portion of the organic phase is recycled to the take-off line 36 or to any suitable point in the recovery system prior to the heating of the freshly removed, emulsion-containing condensing water. It has been found that the recycling of a portion of the organic phase aids in breaking the emulsion of the fresh condensing water by reducing the temperatures to which the condensing water must be heated for emulsion breaking purposes. It should also be noted that prior to introduction of the organic and aqueous phases into the centrifuge, a portion may be by-passed from the system through line 48 until an emulsion-breaking temperature is reached.

By way of an example of continuous daily operation of the recovery system described above, the distillate condenser tower operates with the condensing water in the scrubber section in equilibrium with the barometric condenser portion at a temperature within the range of 85° to 105° F. The operational temperatures and flow rates described above are based on soybean oil processing of the type described above but are generally applicable to other oils. Circulating condensing water is utilized at an average rate of about 1075 g.p.m. and of this amount 16 g.p.m. are removed for treatment through the take-off line 36. The condensing water will contain on the average a concentration of about 0.75% vegetable oil distillates and the amount removed for recovery treatment is at the same temperature as the main portion of recirculating condensing water, namely, ranging from about 85° to 105° F. The pump 37 will be rated for 362,000 b.t.u./hr. The temperature of the separated aqueous phase delivered into indirect heat exchange with the newly withdrawn condensing water in the heat exchanger will be at a temperature of about 170° F., this phase having an organic distillate concentration of about 0.10% and being returned to the tower at a rate of about 210,850 lbs./day. The temperature of the condensing water leaving the heat exchanger will be approximately 130° F. and the line 38 is preferably insulated to maintain this temperature. The steam introduced into the condensing water through the line 39 is carried at 175 p.s.i. and utilized to an extent of 12,100 lbs./day. The temperature of the condensing water and steam following steam injection thereof will be approximately 185° F. The organic phase removed from the centrifuge through the line 40, which is preferably insulated, will be at a rate of about 11,255 lbs./day and contain about 2.5% water. The surge tank is provided with insulation and preferably with a small standby heating unit to maintain fluidity of the recovered distillates. The amount of distillates removed from the surge tank to the drain tank and subsequently to storage will be about 1,255 lbs./day. This provides for the recirculation of about 10,000 lbs./day of distillate through the recycle line 47 which should be insulated. This quantity of distillate constitutes approximately 5% of the total daily amount of condensing water treated for distillate recovery in the system. The temperature of the aqueous phase leaving the heat exchanger will be approximately 120° F. and at this temperature the water should be returned to the flash chamber or reservoir portion of the tower rather than to the scrubber section.

The temperature to which the condensing water portion undergoing distillate recovery treatment is to be heated will be dependent upon the degree of heat necessary to break the emulsion therein. This temperature will also be dependent on whether the recycle portion of the recovery system providing for the recycling of a quantity of the organic phase is in operation. By way of example, it has been found that by the recycling of as little as 5% of the hot organic phase, the instant break temperature of the emulsion may be lowered to a range of from about 155° to 165° F. Otherwise, instant breaking of the emulsion may require temperatures as high as 250° F. For example, a temperature of 190° F. will break the emulsion formed by the soybean oil distillates (no organic phase recycling) while 200° F. may be required to break the emulsion formed by corn oil distillates (no organic phase recycling). Preferably, suitable operating temperatures will fall within the range of about 150° F. to 240° F.

The recovery portion of the overall system should be operated to maintain the condensing water at concentrations of organic material within the range of about 0.50% to 0.90%, the concentration preferably being held between 0.75% to 0.90% to reduce as much as possible the total quantity of water that must be treated. The concentration should be maintained below the transition phase which is characterized by a sharp increase in the "apparent viscosity" which occurs from about 1.0% to 1.5%. Under good operation conditions, the overall efficiency of organic recovery is at least about 95%. Flow rates as high as 18 g.p.m. can be handled satisfactory in one centrifuge. An average of approximately 85% or more efficiency can be attained in the centrifugation step. The organic phase obtained from the centrifuge may contain up to 10% water.

It is preferred that soft water be used in the entire system to safeguard against the formation of deposits in the equipment. The steam used in heating the condensing water undergoing treatment also serves the function of make-up water to provide further economizing of system operational requirements.

In addition to the foregoing, it has been found that the maintaining of a relatively small percentage of electrolytes in the scrubber condensing water results in increased efficiency of centrifugation as well as an increased tolerance of the condensing water for organic distillate concentrations higher than 1%. Preferably, electrolytes such as sodium chloride and sodium sulfate will be used in small concentrations of about 1% to 2% in the scrubber condensing water. The extent to which electrolytes are used should be controlled to refrain from increasing the pH of the water to an extent which promotes the forming of soaps which cause foaming. The maintenance of electrolyte concentration may be attended in any suitable manner. In the presence of electrolytes the efficiency of the centrifugation step may be raised to 99-plus percent.

From the foregoing it will be noted that the recovery of high purity vegetable fat and oil distillates from the scrubber condensing water is made possible on a practical and economical basis. The recycling of a portion of the recovered distillates resulting in the lowering of the temperatures required to break the condensing water emulsion is a feature which is especially useful to processers of hydrogenated oils or high titer fatty acids. In the placing of the entire system "on stream," it is possible to continuously operate the same requiring little or no make-up water with the system both thermodynamically and materially balancing itself with little or no operational control required.

Obviously certain modifications and variations of the invention as hereinbefore set forth may be made without departing from the spirit and scope thereof, and therefore only such limitations should be imposed as are indicated in the appended claims.

I claim:

1. In the treatment of vegetable oil distillates forming a part of deodorization vapors wherein the distillates are to a substantial extent condensed by scrubbing with water to form an oil-in-water emulsion, the improvement which comprises maintaining fluidity of said water for continuous reuse thereof by heating the emulsion formed to a temperature adequate to break the same into an organic phase and an aqueous phase, and separating said organic phase from said aqueous phase by centrifugation, a portion of said organic phase while still in heated condition being mixed with said emulsion prior to the heating thereof.

2. In the operation of a vegetable oil distillate recovery system wherein distillate from the deodorization treatment of a vegetable oil is continuously condensed in circulating water to form an oil-in-water emulsion, the improvement of continuously heating a portion of said water following the formation of said emulsion therein, the temperature of said water being raised to an extent adequate to break said emulsion to form an organic phase and an aqueous phase, separating said phases from one another by centrifugation, recovering said organic phase as a by-product, a portion of said organic phase being recycled and combined with said emulsion prior to heating thereof, and recycling said aqueous phase as make-up to said circulating water.

3. In the operation of a vegetable oil distillate recovery system wherein distillate from the deodorization treatment of a vegetable oil is continuously condensed in circulating water to form an oil-in-water emulsion, the improvement of continuously heating a portion of said water following the formation of said emulsion therein, the temperature of said water being raised to an extent adequate to break said emulsion to form an organic phase and an aqueous phase, separating said phases from one another by centrifugation, recovering said organic phase as a by-product, a portion of said organic phase being recycled and combined with said emulsion prior to heating thereof, and recycling said aqueous phase as make-up to said circulating water, said aqueous phase during recycling being passed in heat exchange relation with said emulsion.

4. In the operation of a vegetable oil distillate recovery system wherein distillate from the deodorization treatment of a vegetable oil is continuously condensed in circulating water to form an oil-in-water emulsion, the improvement of continuously heating a portion of said water following the formation of said emulsion therein, the temperature of said water being raised to an extent adequate to break said emulsion to form an organic phase and an aqueous phase, separating said phases from one another by centrifugation, recovering said organic phase as a by-product, a portion of said organic phase being recycled and combined with said emulsion prior to heating thereof, and recycling said aqueous phase as make-up to said circulating water, said aqueous phase during recycling being passed in heat exchange relation with said emulsion, the removal of distillates from said circulating water being adequate to maintain a concentration of organic material therein in the range of about 0.50% to 0.90%.

5. In the operation of a vegetable oil distillate recovery system wherein distillate from the deodorization treatment of a vegetable oil is continuously condensed in circulating water to form an oil-in-water emulsion, the improvement of continuously heating a portion of said water following the formation of said emulsion therein, the temperature of said water being raised to an extent adequate to break said emulsion to form an organic phase and an aqueous phase, separating said phases from one another by centrifugation, recovering said organic phase as a by-product, a portion of said organic phase being recycled and combined with said emulsion prior to heating thereof, said recycled organic phase portion being equal to about 5% of said emulsion, and recycling said aqueous phase as make-up to said circulating water, said aqueous phase during recycling being passed in heat exchange relation with said emulsion, said circulating water having maintained therein a low concentration of about 1% to 2% of an electrolyte.

6. In the operation of a vegetable oil distillate recovery system wherein distillate from the deodorization treatment of a vegetable oil is continuously condensed in circulating water to form an oil-in-water emulsion, the improvement of continuously heating a portion of said water following the formation of said emulsion therein to a temperature within the range of about 150° F. to 240° F., the temperature of said water being raised to an extent adequate to break said emulsion to form an organic phase and an aqueous phase, separating said phases from one another by centrifugation, recovering said organic phase as a by-product, a portion of said organic phase being recycled and combined with said emulsion prior to heating thereof, said recycled organic phase portion being equal to about 5% of said emulsion, and recycling said aqueous phase as make-up to said circulating water, said aqueous phase during recycling being passed in heat exchange relation with said emulsion, said circulating water having maintained therein a low concentration of about 1% to 2% of an electrolyte, the removal of distillates from said circulating water being adequate to maintain a concentration of organic material therein in the range of about 0.50% to 0.90%.

7. The method of claim 2 wherein said circulating water has maintained therein a low concentration of an electrolyte.

References Cited in the file of this patent

UNITED STATES PATENTS

| | | |
|---|---|---|
| 1,710,374 | Moscicki | Apr. 23, 1929 |
| 2,333,856 | Gerhold | Nov. 9, 1943 |
| 2,431,554 | Hansley et al. | Nov. 25, 1947 |
| 2,472,499 | Stone | June 7, 1949 |
| 2,663,717 | Strezynski et al. | Dec. 22, 1953 |
| 2,723,950 | Petersen | Nov. 15, 1955 |

OTHER REFERENCES

Gulino et al.: "J. Am. Oil Chemists' Soc." vol. 26, pages 418 to 422 (1949).